United States Patent
Li et al.

(10) Patent No.: US 11,537,774 B2
(45) Date of Patent: Dec. 27, 2022

(54) OPTIMIZED RECONFIGURATION ALGORITHM BASED ON DYNAMIC VOLTAGE AND FREQUENCY SCALING

(71) Applicant: SHANGHAITECH UNIVERSITY, Shanghai (CN)

(72) Inventors: Rui Li, Shanghai (CN); Yajun Ha, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 0 days.

(21) Appl. No.: 17/595,194

(22) PCT Filed: Jun. 9, 2021

(86) PCT No.: PCT/CN2021/099124
§ 371 (c)(1),
(2) Date: Nov. 11, 2021

(87) PCT Pub. No.: WO2022/012232
PCT Pub. Date: Jan. 20, 2022

(65) Prior Publication Data
US 2022/0309217 A1      Sep. 29, 2022

(30) Foreign Application Priority Data
Jul. 17, 2020   (CN) .......................... 202010690442.9

(51) Int. Cl.
*G06F 30/34*      (2020.01)
*G06F 30/337*     (2020.01)
*G06F 30/3323*    (2020.01)

(52) U.S. Cl.
CPC ............ *G06F 30/34* (2020.01); *G06F 30/337* (2020.01); *G06F 30/3323* (2020.01)

(58) Field of Classification Search
USPC ....................................................... 716/117
See application file for complete search history.

(56) References Cited

U.S. PATENT DOCUMENTS

| 9,940,187 B2 * | 4/2018 | Jain .................... G06N 20/00 |
| 2016/0034013 A1 | 2/2016 | Kim et al. |
| 2016/0306689 A1 * | 10/2016 | Jain .................... G06N 20/00 |

FOREIGN PATENT DOCUMENTS

| CN | 107895225 A | 4/2018 |
| CN | 110795238 A | 2/2020 |
| CN | 111858463 A | 10/2020 |

OTHER PUBLICATIONS

Rui Santos, et al., Criticality-aware Scrubbing Mechanism for SRAM-based FPGAs, 24th International Conference on Field Programmable Logic and Applications (FPL), 2014, pp. 1-8.

(Continued)

*Primary Examiner* — Mohammed Alam
(74) *Attorney, Agent, or Firm* — Bayramoglu Law Offices LLC

(57) ABSTRACT

An optimized reconfiguration algorithm based on dynamic voltage and frequency scaling (DVFS) is provided, which mainly has the following contributions. The optimized reconfiguration algorithm based on DVFS proposes a DVFS-based reconfiguration method, which schedules user tasks according to a degree of parallelism (DOP) of the user tasks so as to reconfigure more parallel user tasks, thereby achieving higher reliability. The optimized reconfiguration algorithm based on DVFS proposes a K-means-based heuristic approximation algorithm, which minimizes the delay of the DVFS-based reconfiguration scheduling algorithm. The optimized reconfiguration algorithm based on DVFS proposes a K-means-based method, which reduces memory overhead caused by DVFS-based reconfiguration scheduling. The optimized reconfiguration algorithm based on DVFS improves the reliability of a field programmable gate array (FPGA) system and minimizes the area overhead of a hardware circuit.

6 Claims, 1 Drawing Sheet

(56) References Cited

OTHER PUBLICATIONS

Dimitris Agiakatsikas, et al., Reconfiguration Control Networks for TMR Systems with Module-based Recovery, 2016 IEEE 24th Annual International Symposium on Field-Programmable Custom Computing Machines(FCCM), 2016, pp. 88-91.

Nguyen T. H. Nguyen, et al., Dynamic Scheduling of Voter Checks in FPGA-based TMR Systems, 2016 International Conference on Field-Programmable Technology(FPT), 2016, pp. 169-172.

Rui Santos, et al., Dynamically Adaptive Scrubbing Mechanism for Improved Reliability in Reconfigurable Embedded Systems, 52nd ACM/EDAC/IEEE Design Automation Conference (DAC), 2015, pp. 1-6.

Houssine Chetto, et al., Some Results of the Earliest Deadline Scheduling Algorithm, IEEE Transactions on Software Engineering, 1989, pp. 1261-1269, vol. 15, No. 10.

* cited by examiner

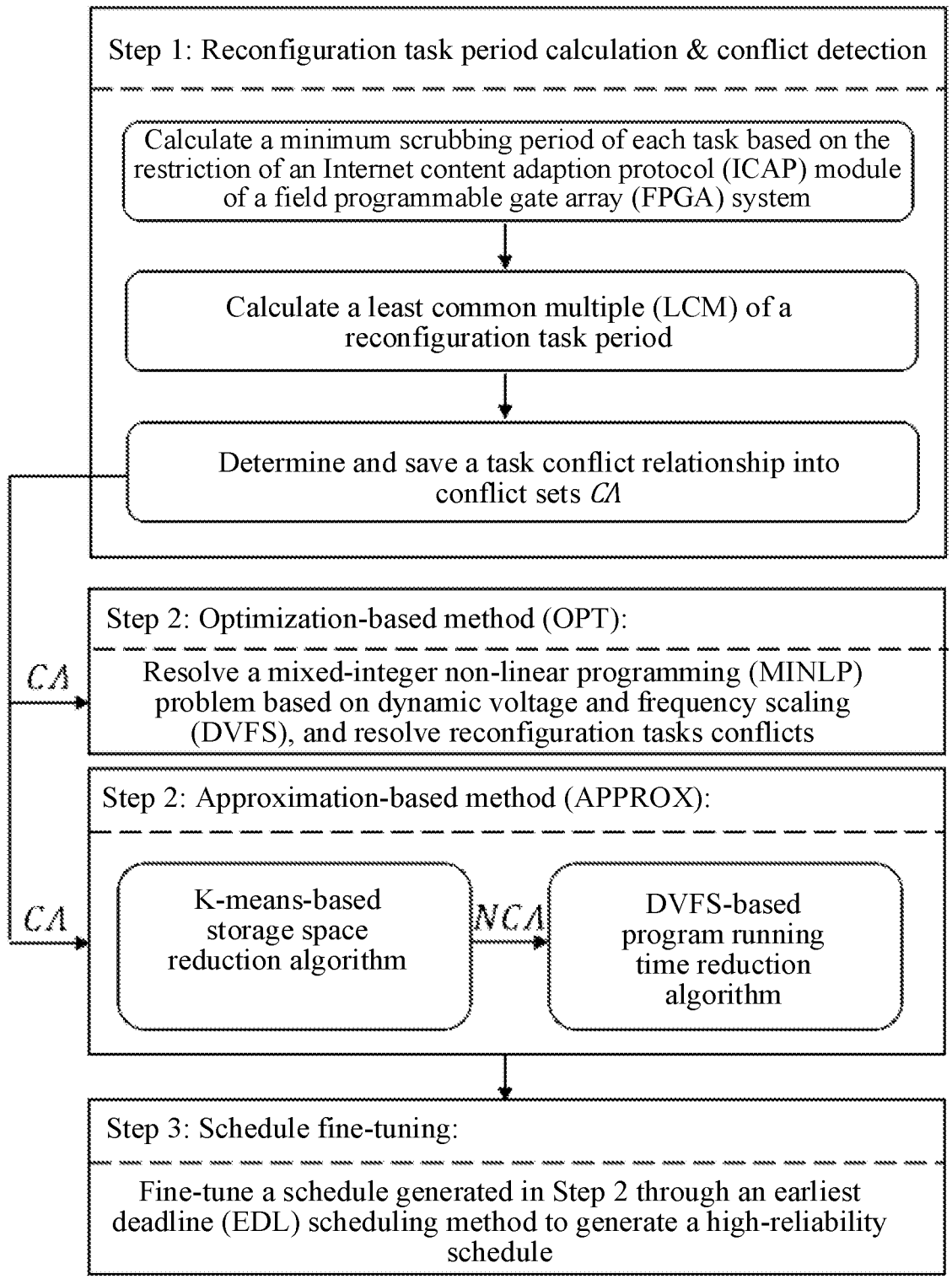

OPTIMIZED RECONFIGURATION ALGORITHM BASED ON DYNAMIC VOLTAGE AND FREQUENCY SCALING

CROSS REFERENCE TO THE RELATED APPLICATIONS

This application is the national stage entry of International Application No. PCT/CN2021/099124, filed on Jun. 9, 2021, which is based upon and claims priority to Chinese Patent Application No. 202010690442.9 filed on Jul. 17, 2020, the entire contents of which are incorporated herein by reference.

TECHNICAL FIELD

The present disclosure relates to a method for scheduling circuit reconfiguration tasks based on dynamic voltage and frequency scaling (DVFS).

BACKGROUND

The field programmable gate array (FPGA) based on static random access memory (SRAM) is a preferred energy-efficient computing platform for applications such as satellites and smart cars. The SRAM-based FPGA has powerful computing capability, ultra-high performance, and the flexibility of reconfigurable circuits. Moreover, FPGA has significant advantages such as low cost and fast time to market, which is superior to the application specific integrated circuit (ASIC). However, the SRAM-based FPGA was not originally designed and developed for high-reliability application scenarios. When the FPGA is exposed to a very high level of radiation such as space radiation, it is susceptible to a single-event upset (SEU). In this case, due to the charged particles striking the chip, the state of the chip's configuration memory and on-chip memory such as block random access memory (BRAM) or flip-flop (FF) may experience an upset (R. Santos, S. Venkataraman, A. Das, and A. Kumar, *Criticality-aware scrubbing mechanism for SRAM-based FPGAs* in 2014 24$^{th}$ International Conference on Field Programmable Logic and Applications (FPL), Sep. 2014, pp. 1-8., hereinafter referred to as Reference [1]). This may lead to a change in the hardware function and cause an erroneous running result. Therefore, in terms of reliability, the data stored in the SRAM is easily affected by the external environment under a high level of radiation, which may cause a data upset and make the FPGA system unstable.

In the past few decades, many methods have been proposed to mitigate the effect of SEU in the FPGA. Generally, there are two stages to ensure the reliability of the FPGA system. In the first stage, modular redundancy (such as triple modular redundancy (TMR), using three identical modules for one task) or information redundancy (such as a self-check circuit or an error correction code (ECC) memory) is applied to detect errors in the memory. In the second stage, the FPGA configuration memory is reconfigured for scrubbing the configuration memory, so as to eliminate the detected SEU error. In recent years, many methods that combine these two stages have been proposed, such as TMR with module-based error recovery (TMR-MER) (D. Agiakatsikas, N. T. H. Nguyen, Z. Zhao, T. Wu, E. Cetin, 0. Diessel, and L. Gong, *Reconfiguration control networks for TMR systems with module-based recovery*, in 2016 IEEE 24$^{th}$ Annual International Symposium on Field-Programmable Custom Computing Machines (FCCM), May 2016, pp. 88-91., hereinafter referred to as Reference [2]; N. T. H. Nguyen, D. Agiakatsikas, E. Cetin, and O. Diessel, *Dynamic scheduling of voter checks in FPGA-based tmr systems*, in 2016 International Conference on Field-Programmable Technology (FPT), December 2016, pp. 169-172., hereinafter referred to as Reference [3]). However, these methods all have the problems of large FPGA circuit area overhead or long average repair time for specific faults.

In order to solve these problems, some circuit reconfiguration (scrubbing) techniques without TMR have recently been proposed (Reference [1]; and R. Santos, S. Venkataraman, and A. Kumar, *Dynamically adaptive scrubbing mechanism for improved reliability in reconfigurable embedded systems*, in 2015 52' ACM/EDAC/IEEE Design Automation Conference (DAC), June 2015, pp. 1-6., hereinafter referred to as Reference [4]). These methods include the following: reconfiguring the configuration memory of each user task to ensure the correctness of the hardware before executing each user task, which omits the TMR stage to reduce area overhead. However, in the case of parallel tasks, unexpected reconfiguration requests may occur frequently. Due to the restriction of the FPGA's reconfiguration module (Internet content adaptation protocol (ICAP)) that only one task can be reconfigured at a time, multiple reconfiguration requests will be delayed or ignored, resulting in reduced system reliability (Reference [1]; and Reference [4]).

SUMMARY

The present disclosure aims to solve the problem that a field programmable gate array (FPGA) based on a static random access memory (SRAM) is unreliable under a high level of radiation.

In order to achieve the above objective, the present disclosure provides the following technical solution: an optimized reconfiguration algorithm based on dynamic voltage and frequency scaling (DVFS). The optimized reconfiguration algorithm includes the following steps:

step 1: extracting user task information of all user tasks mapped to an FPGA system;

step 2: adjusting running periods of corresponding circuit reconfiguration tasks through an integer linear programming (ILP) method, for each of the user tasks, according to the use of an Internet content adaptation protocol (ICAP) module of the FPGA system and importance of a current user task; scheduling each of the generated circuit reconfiguration tasks to precede corresponding user tasks according to the calculated running periods; and collecting the circuit reconfiguration tasks and the corresponding user tasks into conflict sets CΛ according to a conflict relationship of the circuit reconfiguration tasks;

step 3: resolving conflicts between the circuit reconfiguration tasks in the conflict sets CΛ obtained in step 2, corresponding to different scenarios, by using one of the following two methods:

in a scenario that requires very high FPGA reliability and is not sensitive to a program running time: continuously calling a mixed-integer nonlinear programming (MINLP) optimization solver to solve a nonlinear integer optimization problem, and rescheduling running frequencies of the user tasks and start time of the circuit reconfiguration tasks by using DVFS to maximize the stability of the FPGA system; and in a scenario that requires relatively low FPGA reliability but is sensitive to the program running time: designing an approximation algorithm for an original optimization problem based on an approximate DVFS-based scheduling method, and rescheduling the user tasks and the circuit reconfiguration tasks by using DVFS to maximize the stability of the FPGA system while significantly reducing an algorithm running time;

step 4: fine-tuning a schedule generated in step 3 through an Earliest Deadline as Late as possible (EDL) algorithm to obtain a final schedule of the circuit reconfiguration tasks; and step 5: reading scheduling information of each of the user tasks generated in step 4, and continuously reconfiguring a circuit of each of the user tasks to improve the stability of the FPGA system.

Preferably, in step 1, the user task information may include running periods and maximum running frequencies of the user tasks.

Preferably, in step 2, for an i-th user task, based on the use of the ICAP module of the FPGA system and the importance of the user task, the running period $ST_i$ of an i-th circuit reconfiguration task corresponding to the i-th user task may be adjusted through the ILP method according to Eq. (1):

$$\text{Objective: min} \sum_{i=1}^{|S\Lambda|} \frac{ST_i}{T_i} \times \xi_i \text{ s.t.} \sum_{i=1}^{|S\Lambda|} \frac{SW_i}{ST_i} \times ubound \quad (1)$$

in Eq. (1), a scrubbing time corresponding to the i-th circuit reconfiguration task is $SW_i$; the running period of the i-th user task is $T_i$; the number of the circuit reconfiguration tasks is $|S\Lambda|$; the importance of the i-th user task is $\xi_i$; and use time of the ICAP module of the FPGA system does not exceed $ubound$;

a least common multiple (LCM) of the running period of each of the circuit reconfiguration tasks may be calculated, and only user tasks and circuit reconfiguration tasks in an LCM time period may be scheduled; and for each LCM time gap, the scheduled user tasks and circuit reconfiguration tasks may be repeated;

after the running periods of the circuit reconfiguration tasks have been calculated, each of the generated circuit reconfiguration tasks may be scheduled to precede corresponding user tasks according to the calculated running periods; and the circuit reconfiguration tasks and the corresponding user tasks may be collected into the conflict sets $C\Lambda$ according to a conflict relationship of the circuit reconfiguration tasks.

Preferably, in step 3, the MINLP optimization solver may be continuously called to reduce a time gap between the circuit reconfiguration tasks and the user tasks by optimizing an objective function expressed by Eq. (2):

$$\text{Objective: min}_{f_i, ss_i} \left[ \kappa_1 \sum_{\sigma_i \in C\Lambda} (\xi_i \times gap_i)^2 + \kappa_2 \sum_{\sigma_i \in C\Lambda} ue_i \right] \quad (2)$$

in Eq. (2), $gap_i$ represents a time gap between an i-th circuit reconfiguration task and an i-th user task; $ss_i$ is start time of the i-th circuit reconfiguration task; $ue_i$ is running power consumption of the i-th user task, which is related to a running frequency $f_i$ of the user task; $\sigma_1$ is the i-th user task in the conflict set $C\Lambda$; and $\kappa_1$ and $\kappa_2$ are hyperparameters, representing a reliability factor and an energy consumption factor of the system, respectively.

Preferably, $\gamma$ may be defined as a ratio of reliability to energy consumption, and proportions of the hyperparameters $\kappa_1$ and $\kappa_2$ in the objective function expressed by Eq. (2) may be adjusted by adjusting $\gamma$.

Preferably, in step 3, the approximate DVFS-based scheduling method may be divided into two parts; a first part may be defined by a storage space reduction algorithm implemented by a profile module; the profile module may output a feature vector weighted by the importance of each of the user tasks for each of the conflict sets $C\Lambda$; the feature vector may record the number of conflicts between each of the circuit reconfiguration tasks and other circuit reconfiguration tasks; for example, a first element of the vector may be the number of conflicts between a first circuit reconfiguration task and other circuit reconfiguration tasks and may be weighted by the normalized importance of a first user task; through a K-means algorithm, conflict sets $C\Lambda$ with similar characteristics may be aggregated into a larger conflict set $NC\Lambda$; and the user tasks and the circuit reconfiguration tasks in $NC\Lambda$ may be rescheduled, and all user tasks with the same task identification (ID) may be scheduled at the same frequency; and a second part may be defined by a running time reduction algorithm; the running time reduction algorithm may reduce conflicts between the circuit reconfiguration tasks by rescheduling the conflict set $NC\Lambda$ generated by the K-means algorithm; the running time reduction algorithm may increase the frequencies and voltages of the user tasks to save execution time of the user tasks; the running time reduction algorithm may use a saved time gap to schedule a corresponding circuit reconfiguration task; the frequencies of the user tasks may be increased to a certain value to generate a time gap equal to a circuit reconfiguration time of the user tasks for reconfiguration of the user tasks; and corresponding circuit reconfigurations may be scheduled to precede the user tasks are executed.

The present disclosure mainly has the following contributions:

(1) The present disclosure proposes a DVFS-based reconfiguration method, which schedules user tasks according to a degree of parallelism (DOP) of the user tasks so as to reconfigure more parallel user tasks, thereby achieving higher reliability.

(2) The present disclosure proposes a K-means-based heuristic approximation algorithm, which minimizes the delay of the DVFS-based reconfiguration scheduling algorithm.

(3) The present disclosure proposes a K-means-based method, which reduces memory overhead caused by DVFS-based reconfiguration scheduling.

Compared with the prior art, the present disclosure has the following advantages:

The present disclosure adjusts the execution time of the user tasks based on DVFS so as to reschedule the user tasks and reduce the parallelism of the user tasks. In this way, the present disclosure reduces potential conflicts of unexpected configuration requests to the reconfiguration module of the FPGA. Compared with the existing method, the present disclosure improves the reliability of the FPGA system and minimizes the area overhead of the hardware circuit.

BRIEF DESCRIPTION OF THE DRAWINGS

FIG. 1 is a flowchart of the present disclosure.

DETAILED DESCRIPTION OF THE EMBODIMENTS

The present disclosure will be described in detail below with reference to specific embodiments. It should be understood that these embodiments are only intended to describe the present disclosure, rather than to limit the scope of the present disclosure. In addition, it should be understood that various changes and modifications may be made on the present disclosure by those skilled in the art after reading the content of the present disclosure, and these equivalent changes and modifications also fall within the scope defined by the appended claims of the present disclosure.

As shown in FIG. 1, the present disclosure provides an optimized reconfiguration algorithm based on dynamic voltage and frequency scaling (DVFS), including the following steps:

Step 1: User task information of all user tasks mapped to a field programmable gate array (FPGA) system is extracted, where the user task information of an i-th user task includes a running period $T_i$ and a maximum running frequency $f_i$ of the user task.

For the i-th user task, based on the use of an Internet content adaptation protocol (ICAP) module of the FPGA system and importance of the user task, a running period $ST_i$ of an i-th circuit reconfiguration task corresponding to the i-th user task is adjusted through an integer linear programming (ILP) method according to Eq. (1):

$$\text{Objective: } \min \sum_{i=1}^{|S\Lambda|} \frac{ST_i}{T_i} \times \xi_i \text{ s.t.} \sum_{i=1}^{|S\Lambda|} \frac{SW_i}{ST_i} \times ubound \quad (1)$$

in Eq. (1), a scrubbing time corresponding to the i-th circuit reconfiguration task is $SW_i$; the running period of the i-th user task is $T_i$; the number of the circuit reconfiguration tasks is $|S\Lambda|$; the importance of the i-th user task is $\xi_i$; and use time of the ICAP module of the FPGA system does not exceed ubound.

Since the present disclosure also considers the importance of the user tasks, the reliability of more important tasks is also higher.

The circuit reconfiguration tasks are periodic tasks. A least common multiple (LCM) of the running period of each of the circuit reconfiguration tasks is calculated, such that only user tasks and circuit reconfiguration tasks in an LCM time period are scheduled. For each LCM time gap, the scheduled user tasks and circuit reconfiguration tasks are repeated.

After the running periods of the circuit reconfiguration tasks are calculated, each of the generated circuit reconfiguration tasks is scheduled to precede corresponding user tasks according to the calculated running periods. Scheduling at this time is illegal because most tasks conflict with each other. The circuit reconfiguration tasks and the corresponding user tasks are collected into conflict sets $C\Lambda$ according to a conflict relationship of the circuit reconfiguration tasks, and then are fed to the following modules to reduce conflicts between the tasks so as to generate a final legal high-reliability schedule.

Step 2: Since many circuit reconfiguration tasks in the task conflict sets $C\Lambda$ obtained in step 1 conflict with each other, the present disclosure provides two DVFS-based methods to adjust the running frequencies of the user tasks so as to resolve conflicts between the circuit reconfiguration tasks, according to the extracted maximum frequencies $f_i$ of the user tasks. The two DVFS-based methods corresponding to different scenarios as follows.

The present disclosure proposes an optimized DVFS-based scheduling method for a scenario that requires very high FPGA reliability and is not sensitive to a program running time. This method continuously calls a mixed-integer nonlinear programming (MINLP) optimization solver to solve a nonlinear integeroptimization problem. This method reduces a time gap between the circuit reconfiguration tasks and the user tasks by optimizing an objective function of Eq. (2), and reschedules running frequencies of the user tasks and start time of the circuit reconfiguration tasks by using DVFS so as to maximize the stability of the FPGA system.

$$\text{Objective: } \min_{f_i, ss_i} \left[ \kappa_1 \sum_{\sigma_i \in C\Lambda} (\xi_i \times gap_i)^2 + \kappa_2 \sum_{\sigma_i \in C\Lambda} ue_i \right] \quad (2)$$

in Eq. (2), $gap_i$ represents a time gap between an i-th circuit reconfiguration task and an i-th user task; $ss_i$ is start time of the i-th circuit reconfiguration task; $ue_i$ is running power consumption of the i-th user task, which is related to a running frequency $f_i$ of the user task; $\sigma_1$ is the i-th user task in the conflict set $C\Lambda$; and $\kappa_1$ and $\kappa_2$ are hyperparameters, representing a reliability factor and an energy consumption factor of the system, respectively. $\gamma$ is defined as a ratio of reliability to energy consumption, and proportions of the two factors in the objective function to be optimized are adjusted by adjusting $\gamma$. For example, by increasing $\gamma$, the reliability factor is given a greater weight than the energy consumption factor to optimize the system reliability.

The present disclosure proposes an approximate DVFS-based scheduling method for a scenario that requires relatively low FPGA reliability but is sensitive to the program running time. This method designs an approximation algorithm for an original optimization problem based on an approximate DVFS-based scheduling method, and reschedules the user tasks and the circuit reconfiguration tasks by using DVFS so as to maximize the stability of the FPGA system while significantly reducing an algorithm running time.

The approximate DVFS-based scheduling method is divided into two parts. A first part is defined by a storage space reduction algorithm, and a first step of the algorithm is implemented by a profile module. The profile module outputs a feature vector weighted by the importance of each of the user tasks for each of the conflict sets $C\Lambda$. The feature vector records the number of conflicts between each of the circuit reconfiguration tasks and other circuit reconfiguration tasks, namely, a first element of the vector is the number of conflicts between a first circuit reconfiguration task and other circuit reconfiguration tasks and is weighted by the normalized importance of a first user task. Through a K-means algorithm, conflict sets with similar characteristics are aggregated into a larger conflict set $NC\Lambda$. The user tasks and the circuit reconfiguration tasks in $NC\Lambda$ are rescheduled simultaneously, and all user tasks with the same task identification (ID) are scheduled at the same frequency. In this way, the storage of the frequency/voltage pairs of the user tasks by the approximation algorithm is reduced, so that it is easier to deploy the algorithm in the FPGA system.

A second part of the approximate DVFS-based scheduling method is defined by a running time reduction algorithm. The running time reduction algorithm reduces conflicts between the circuit reconfiguration tasks by rescheduling the conflict set $NC\Lambda$ generated by the K-means algorithm. The running time reduction algorithm increases the frequencies and voltages of the user tasks so as to save execution time of the user tasks. The running time reduction algorithm uses a saved time gap to schedule a corresponding circuit reconfiguration task. The frequencies of the user tasks are increased to a certain value so as to generate a time gap equal to a circuit reconfiguration time of the user tasks for reconfiguration of the user tasks. A subsequently proposed algorithm is used to schedule corresponding circuit reconfigurations before the user tasks are executed.

Step 3: The schedule generated in Step 2 may still have some conflicts between the tasks. Therefore, the present disclosure uses an Earliest Deadline as Late as possible (EDL) algorithm (Chetto H, Chetto M. *Some results of the earliest deadline scheduling algorithm* [J]. IEEE Transactions on Software Engineering, 1989, 15(10): 1261-1269. DOI:10.1109/TSE.1989.559777, referred to as Reference [5]) to fine-tune the schedule generated in Step 2. The EDL algorithm ensures that the final circuit reconfiguration tasks are not conflicted, and each circuit reconfiguration task is scheduled to run before the execution of the user task as much as possible. Finally, this method generates a highly reliable schedule of the circuit reconfiguration tasks. During running, the scheduling information of each of the user tasks is read, and a circuit of each of the user tasks is continuously reconfigured so as to improve the stability of the FPGA system.

What is claimed is:

1. An optimized reconfiguration algorithm based on dynamic voltage and frequency scaling (DVFS), comprising the following steps:
   step 1: extracting user task information of user tasks mapped to a field programmable gate array (FPGA) system;
   step 2: adjusting running periods of corresponding circuit reconfiguration tasks through an integer linear programming (ILP) method, for each of the user tasks, according to use of an Internet content adaptation protocol (ICAP) module of the FPGA system and importance of a current user task; scheduling each of generated circuit reconfiguration tasks to precede corresponding user tasks according to calculated running periods; and collecting the circuit reconfiguration tasks and the corresponding user tasks into conflict sets CΛ according to a conflict relationship of the circuit reconfiguration tasks;
   step 3: resolving conflicts between the circuit reconfiguration tasks in the conflict sets CΛ obtained in step 2, corresponding to different scenarios, by using one of the following two methods:
   in a scenario that requires high FPGA reliability and is not sensitive to a program running time: continuously calling a mixed-integer nonlinear programming (MINLP) optimization solver to solve a nonlinear integer optimization problem, and rescheduling running frequencies of the user tasks and start time of the circuit reconfiguration tasks by using DVFS to maximize stability of the FPGA system; and
   in a scenario that requires relatively low FPGA reliability but is sensitive to the program running time: designing an approximation algorithm for an original optimization problem based on an approximate DVFS-based scheduling method, and rescheduling the user tasks and the circuit reconfiguration tasks by using DVFS to maximize the stability of the FPGA system while significantly reducing an algorithm running time;
   step 4: fine-tuning a schedule generated in step 3 through an Earliest Deadline as Late as possible (EDL) algorithm to obtain a final schedule of the circuit reconfiguration tasks; and
   step 5: reading scheduling information of each of the user tasks generated in step 4, and continuously reconfiguring a circuit of each of the user tasks to improve the stability of the FPGA system.

2. The optimized reconfiguration algorithm based on DVFS according to claim 1, wherein in step 1, the user task information comprises running periods and maximum running frequencies of the user tasks.

3. The optimized reconfiguration algorithm based on DVFS according to claim 2, wherein in step 2, for an i-th user task, based on the use of the ICAP module of the FPGA system and the importance of the user task, the running period $ST_i$ of an i-th circuit reconfiguration task corresponding to the i-th user task is adjusted through the ILP method according to Eq. (1):

$$\text{Objective: } \min \sum_{i=1}^{|S\Lambda|} \frac{ST_i}{T_i} \times \xi_i \text{ s.t. } \sum_{i=1}^{|S\Lambda|} \frac{SW_i}{ST_i} \times ubound \tag{1}$$

in Eq. (1), a scrubbing time corresponding to the i-th circuit reconfiguration task is $SW_i$; the running period of the i-th user task is $T_i$; the number of the circuit reconfiguration tasks is $|S\Lambda|$; importance of the i-th user task is $\xi_i$; and use time of the ICAP module of the FPGA system does not exceed ubound;

a least common multiple (LCM) of the running period of each of the circuit reconfiguration tasks is calculated, and user tasks and circuit reconfiguration tasks in an LCM time period are scheduled; and for each LCM time gap, the scheduled user tasks and circuit reconfiguration tasks are repeated;

after the running periods of the circuit reconfiguration tasks are calculated, each of the generated circuit reconfiguration tasks is scheduled to precede corresponding user tasks according to the calculated running periods; and the circuit reconfiguration tasks and the corresponding user tasks are collected into the conflict sets CΛ according to the conflict relationship of the circuit reconfiguration tasks.

4. The optimized reconfiguration algorithm based on DVFS according to claim 2, wherein in step 3, the MINLP optimization solver is continuously called to reduce a time gap between the circuit reconfiguration tasks and the user tasks by optimizing an objective function expressed by Eq. (2):

$$\text{Objective: } \min_{f_i, ss_i} \left[ \kappa_1 \sum_{\sigma_i \in C\Lambda} (\xi_i \times gap_i)^2 + \kappa_2 \sum_{\sigma_i \in C\Lambda} ue_i \right] \tag{2}$$

in Eq. (2), $gap_i$ represents a time gap between an i-th circuit reconfiguration task and an i-th user task; $ss_i$ is start time of the i-th circuit reconfiguration task; $ue_i$ is running power consumption of the i-th user task, and is related to a running frequency $f_i$ of the user task; $\sigma_1$ is the i-th user task in the conflict set CΛ; and $\kappa_1$ and $\kappa_2$ are hyperparameters, and represent a reliability factor and an energy consumption factor of the FPGA system, respectively.

5. The optimized reconfiguration algorithm based on DVFS according to claim 4, wherein γ is defined as a ratio of reliability to energy consumption, and proportions of the hyperparameters $\kappa_1$ and $\kappa_1$ $\kappa_2$ in the objective function of Eq. (2) are adjusted by adjusting γ.

6. The optimized reconfiguration algorithm based on DVFS according to claim 1, wherein in step 3, the approximate DVFS-based scheduling method is divided into two parts; a first part is defined by a storage space reduction algorithm implemented by a profile module; the profile module outputs a feature vector weighted by the importance of each of the user tasks for each of the conflict sets $C\Lambda$; the feature vector records a number of conflicts between each of the circuit reconfiguration tasks and other circuit reconfiguration tasks; that is, a first element of the feature vector is a number of conflicts between a first circuit reconfiguration task and other circuit reconfiguration tasks and is weighted by normalized importance of a first user task; through a K-means algorithm, conflict sets $C\Lambda$ with similar characteristics are aggregated into a larger conflict set $NC\Lambda$; and the user tasks and the circuit reconfiguration tasks in $NC\Lambda$ are rescheduled, and all user tasks with the same task identification (ID) are scheduled at the same frequency; and a second part is defined by a running time reduction algorithm; the running time reduction algorithm reduces conflicts between the circuit reconfiguration tasks by rescheduling the conflict set $NC\Lambda$ generated by the K-means algorithm; the running time reduction algorithm increases the frequencies and voltages of the user tasks to save execution time of the user tasks; the running time reduction algorithm uses a saved time gap to schedule a corresponding circuit reconfiguration task; the frequencies of the user tasks are increased to a certain value to generate a time gap equal to a circuit reconfiguration time of the user tasks for reconfiguration of the user tasks; and corresponding circuit reconfigurations are scheduled before the user tasks are executed.

* * * * *